(No Model.)

E. ANDREWS, Dec'd.
S. A. ANDREWS, Executrix.
BIT TOOTH SAW.

No. 558,338. Patented Apr. 14, 1896.

Witnesses.

Inventor
Sarah A. Andrews
Executrix of the estate of
Emanuel Andrews, deceased.
by Frank L. Dyer
Atty.

UNITED STATES PATENT OFFICE.

SARAH A. ANDREWS, OF WILLIAMSPORT, PENNSYLVANIA, EXECUTRIX OF EMANUEL ANDREWS, DECEASED.

BIT-TOOTH SAW.

SPECIFICATION forming part of Letters Patent No. 558,338, dated April 14, 1896.

Application filed December 14, 1895. Serial No. 572,216. (No model.)

*To all whom it may concern:*

Be it known that I, SARAH A. ANDREWS, a citizen of the United States, residing at Williamsport, in the county of Lycoming and State of Pennsylvania, executrix of the last will and testament of EMANUEL ANDREWS, late a citizen of the United States, and of the same place, am in possession of an invention relating to Improved Bit-Tooth Saws, invented by the said EMANUEL ANDREWS, of which the following is a specification.

The object of the invention is to provide an improved fastening for the bit-teeth, whereby they will be firmly and rigidly held in position, and by means of which the bit-teeth may be quickly and readily removed for sharpening or for the substitution of new bits when desired.

In order that the invention may be better understood, attention is directed to the accompanying drawings, forming part of this specification, and in which—

Figure 1:
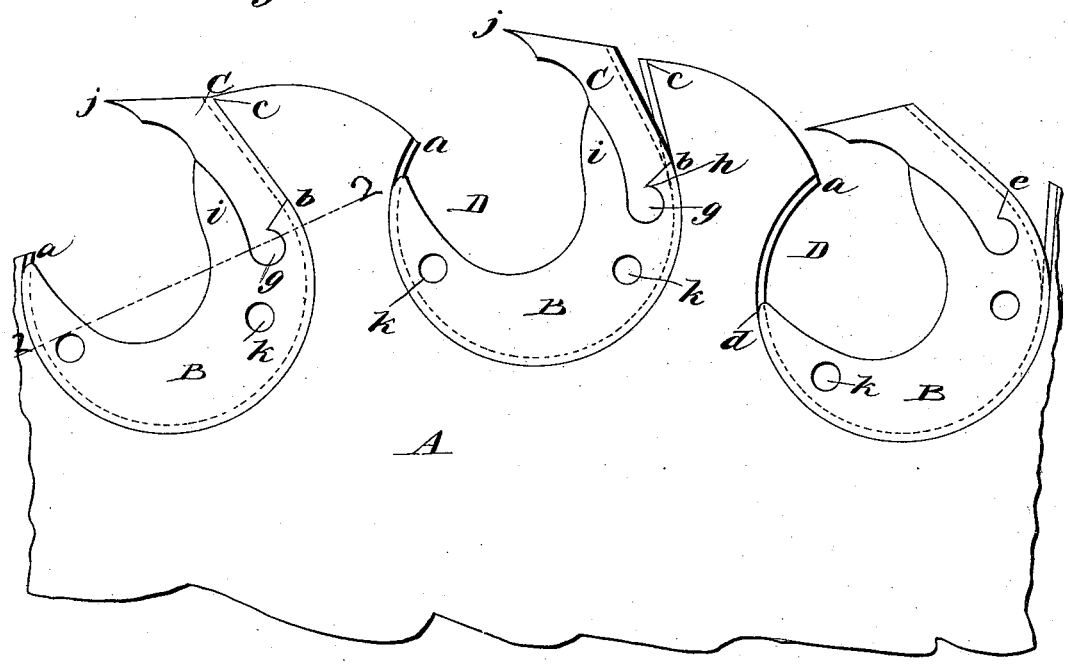
Figure 2:
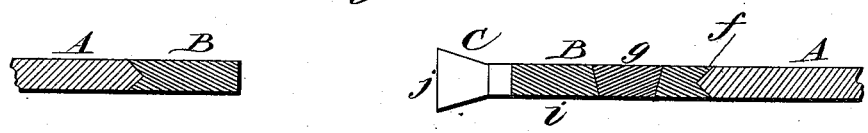

Figure 1 is a plan view of a portion of a circular saw embodying the invention and illustrating three bit-teeth, that on the right being shown as just inserted in place, that in the middle being shown with the shank partially in position, but the bit being capable of removal, and that at the left being shown with the bit and shank secured in their operative positions; and Fig. 2, a sectional view on the line 2 2 of Fig. 1.

In both of the views the same parts are represented by corresponding reference-letters.

A represents the body of the saw; B, the shank, and C the bit.

The body of the saw A is formed with recesses D therein for the reception of the shanks, each of said recesses being struck on a true circle from the points $a$ to $b$ and on a tangent of the circle from the points $b$ to $c$. The curved portion of each recess between the points $a$ and $b$ is slightly more than a half-circle, but it may be greater or less than this.

The shank B, which serves to lock the bit C in place, is of the general shape shown, its outer periphery from one end $d$ to the other end $e$ being struck on a true circle and being adapted, when the bit is secured in its operative position, to coincide with the circular portion of the recess D. The joint between the shank and the recess D is, preferably, an interlocking joint of some suitable character, the preferred joint illustrated consisting in making the circular portion of the recess D apexed and in forming upon the circular portion of the shank a similarly-shaped groove.

The bit C is provided with a rear face $f$, which fits against the face of the recess D, extending between the points $b$ and $c$, said face therefore, when the bit and shank are placed together, being on a tangent with the circular portion of the shank. The joint between the rear face of the bit and the adjacent face of the recess D is also, preferably, an interlocking joint, preferably of the same character as that between the shank and the recess. The bit C is also provided with a head $g$ at its lower end, having a contracted neck $h$, said head fitting within a correspondingly-shaped recess in the shank.

The shank B is provided with an upwardly-extending projection $i$, which comes in front of the bit C and when the parts are in their operative position forces the bit back tightly against the tangent portion of the recess D, so that said bit will be held firmly and rigidly in place.

The bit C is provided with a cutting edge $j$, of any suitable construction, at its upper part. In order to facilitate the introduction of the bits, the head $g$ of each is made slightly wider at one side than at the other, and the recess in the shank for the reception of said head is correspondingly shaped, whereby the bits can be introduced into the shanks from one side only and after being introduced into the shanks will hold their positions therein while the shanks are being turned around in the recess D in the operation of securing the bits in position.

In securing the bits in place each bit is first inserted within its shank, as shown at the right in Fig. 1, and the shank is placed in the recess D. By means of any suitable tool, which may, if desired, engage with holes $k$ $k$ in the shank, the shank is turned around to the position shown at the left of Fig. 1, the projection $i$ on the shank forcing the bit back against the tangent portion of the recess. When in operation, the resistance of the work tends to force the bit back against that portion of the recess, so that there can be no danger of the teeth working loose. As a matter of fact, and as will be seen, the bits will be held more firmly in place as the resistance of the work increases.

When it is desired to remove the bits for the purpose of sharpening them or for substituting new bits, it is not necessary to take out the shank entirely, but the shank may be turned partially around to the position shown in the center of Fig. 1, so as to release the bits and allow them to be taken out.

Having now described the invention, what is claimed as new therein, and desired to be secured by Letters Patent, is as follows:

1. An improved bit-tooth saw, comprising a saw-body, a shank and a bit, the saw-body having a recess therein formed for its major portion on a true circle, and on its minor portion being formed substantially on a tangent to the circle, the shank having its periphery coincident with said circular portion, and the bit having a head engaging a recess formed in the shank, whereby the shank will hold the bit against said tangent portion, said head and recess being wider on one side than the other, substantially as set forth.

2. An improved bit-tooth saw, comprising a saw-body, a shank and a bit, the saw-body having a recess therein formed for its major portion on a true circle, and on its minor portion being formed substantially on a tangent to the circle, the shank having its periphery coincident with said circular portion and provided with a projection which forces the bit against said tangent portion, and the bit having a head engaging a recess in the shank, for locking the bit and shank together, said head and recess being wider on one side than the other, substantially as set forth.

SARAH A. ANDREWS.

In presence of—
ELMER E. COWDRICK,
A. B. MYHART.